United States Patent
Huggett et al.

(10) Patent No.: US 6,316,920 B1
(45) Date of Patent: Nov. 13, 2001

(54) VOLTAGE CONTROLLER FOR MINIMIZING THE UTILITY POWER PROVIDED TO A LOCAL LOAD SITE HAVING A LOCAL POWER SOURCE

(75) Inventors: Colin Huggett, Torrance; Gabor Kalman, Palos Verdes, both of CA (US)

(73) Assignee: Honeywell Power Systems Inc., Albuquerque, NM (US)

( * ) Notice: Subject to any disclaimer, the term of this patent is extended or adjusted under 35 U.S.C. 154(b) by 53 days.

(21) Appl. No.: 09/630,521

(22) Filed: Aug. 2, 2000

Related U.S. Application Data

(63) Continuation of application No. 09/460,188, filed on Dec. 11, 1999.
(60) Provisional application No. 60/111,797, filed on Dec. 11, 1998.

(51) Int. Cl.⁷ ........................................................ G05F 1/70
(52) U.S. Cl. .................................................................. 323/207
(58) Field of Search ...................................... 323/205, 207

(56) References Cited

U.S. PATENT DOCUMENTS

| | | | |
|---|---|---|---|
| 4,845,418 | * 7/1989 | Conner | 318/778 |
| 5,041,959 | * 8/1991 | Walker | 323/207 |
| 5,329,221 | * 7/1994 | Schavder | 323/207 |
| 5,329,222 | * 7/1994 | Gyugyi et al. | 323/207 |
| 5,343,139 | * 8/1994 | Gyugyi et al. | 323/207 |
| 5,428,283 | * 6/1995 | Kalman et al. | 318/729 |
| 5,466,973 | * 11/1995 | Griffioen | 307/17 |
| 5,734,257 | * 3/1998 | Schavder et al. | 323/207 |
| 5,734,586 | * 3/1998 | Chiang et al. | 364/492 |
| 6,107,784 | * 8/2000 | Nomiya et al. | 323/205 |

* cited by examiner

*Primary Examiner*—Jeffrey Sterrett
(74) *Attorney, Agent, or Firm*—Ephraim Starr; Brian Tufte

(57) ABSTRACT

A load site voltage regulation control system. The load site receives electrical power from a utility over transmission lines. The load site also receives electrical power from a local generator unit operating with an inverter. The local generator unit and inverter are coupled to the load by an EMI filter and a transformer. Voltage at the load is controlled by adjusting the inverter voltage using an inverter voltage command. The inverter voltage command is based on load voltage, inverter voltage, EMI filter voltage, utility supplied current, and inverter current. In one embodiment, the inverter voltage is adjusted to minimize utility supplied reactive and real power and to actively dampen EMI filter voltage, with the inverter voltage command being developed though a multi-loop PPI control system.

34 Claims, 5 Drawing Sheets

US 6,316,920 B1

VOLTAGE CONTROLLER FOR MINIMIZING THE UTILITY POWER PROVIDED TO A LOCAL LOAD SITE HAVING A LOCAL POWER SOURCE

This application claims the benefit of U.S. Provisional Application No. 60/111,797, filed Dec. 11, 1998, the disclosure of which is incorporated herein by reference and U.S. Pat. No. 09/460,188, filed Dec. 11, 1999, the disclosure of which is incorporated herein by reference.

BACKGROUND OF THE INVENTION

The present invention relates generally to voltage controllers for power systems, and more particularly to a power system voltage controller used at a load-site.

Electrical power generation is often performed at generation sites distant from the consumers of electrical power. The electrical power is transmitted from the generation sites to the consumers by feeder distribution networks. Local electrical generator units are sometimes used at load sites to augment utility supplied electrical power. Local electrical generators may be used to provide electrical power at a cost cheaper than that supplied by the utility. Large consumers of electricity, such as manufacturing plants and the like, sometimes find it economical to produce some or all of the electrical power they require from local electrical generators, such as micro turbines, rather than to purchase the power from a utility.

For ideal economic local generation of power, the local electrical generator operates at capacity, and all of the power generated by the local electrical generator is used by the load. Further, it is desirable to limit the real power supplied by the utility in some locations to zero. In addition, the reactive capability of the local micro turbine power generation system can be used to control the local voltage, especially at the end of high impedance feeders.

Control of the inverter to achieve this is difficult, however. Due to changes in the load the requirements placed on the inverter to operate micro turbines and maintain efficiency may change dynamically, both as to real and reactive power requirements.

A simplified single line diagram of a local electrical generator coupled to a load in parallel with a feeder distribution system is illustrated in FIG. 1. Although FIG. 1 includes features of the present invention, FIG. 1 is also useful in describing the background of the present invention. As illustrated in FIG. 1, a utility 11 is connected via a source impedance 13 to a local power generation and distribution system 15. The local power generation and distribution system comprises a local energy source 19, whose output power is modified to be compatible with the utility voltage and frequency by an inverter 21, coupled to a load 17. The inverter is, for example, a pulse width modulated (PWM) inverter.

An output filter 23 reduces the harmonic content produced by the inverter. The filter is connected to the load and utility by an additional impedance 25 of the distribution system. The inverter is controlled by a control system 27 that senses voltages and current and regulates the inverter to perform required functioning.

An example power regulator system is illustrated in FIG. 2. In the system of FIG. 2, a local power source and associated inverter (indicated together) 351 are coupled to a transmission line 325 at a load site. The power source and associated inverter provide power to a load 327. Coupled to the connection between the power source and associate inverter and the load is a filter including a capacitor 329. The local power source is therefore connected in parallel to the utility.

The power regulator system of FIG. 2 includes an inverter current regulator (311 and 323). The current regulator provides a signal to the local power source and associated inverter for use in the control of the power source and associated inverter. In the system illustrated in FIG. 2, an inverter current output vector $i_{inv}$ of the inverter is regulated to a desired value.

The current regulator is a vector control system based upon a Park-vector, or space-vector, representation of all three-phase electrical quantities. The use of Park-vectors facilitate transformation of control signals from sinusoidal values in a stationary frame to largely DC level signals in a synchronous frame. Methods of transforming signals from one reference frame to another is well known by those familiar with the art. Park vectors are described in, for example, Transient Phenomena in Electrical Machines by P.K. Kovacs, published by Elsevier (1984), the disclosure of which is incorporated herein by reference.

Accordingly, the inverter current output vector $i_{inv}$ is determined. As the inverter current output vector $i_{inv}$ is measured in the stationary reference frame, a capacitor voltage vector $v_{cap}$ is also determined for use in transforming the inverter current output vector to the synchronous frame. In order to reduce ac signal components in the synchronous frame signal, the capacitor voltage is filtered to reduce harmonics and other noise at frequencies other than those about the fundamental system frequency. Therefore, a rotational reference frame is extracted from the filtered capacitor voltage vector to form a unit vector for transformation to the synchronous frame in an extraction unit 331. The unit vector is provided to a transformation unit 332, as is the inverter current output vector $i_{inv}$. The transformation unit 332 outputs a vector $i_k$, which is comprised of essentially DC signals of a real component and a reactive component, representing the inverter current vector in the synchronous frame. The vector $i_k$, therefore, is the inverter current output vector in the synchronous frame.

The vector $i_k$ is compared with a command reference vector $i_{ikcmd}$ at a summer 323. Generally the command reference signal $i_{ikcmd}$ is empirically determined, and is changed only infrequently. As it is often desirable to provide as much real power from a local power source generator to the load as possible, the real power component is generally set to a maximum, which is a value of one power unit (p.u.) in a normalized system. The reactive component of the command reference signal $i_{ikcmd}$ is generally set to 0.

The output of the summer 323 is provided to a controller 311. The controller 311, in the prior art, amplifies the output of the summer, and provides a voltage vector command $v_{ik}$ in the synchronous frame. The voltage vector command provided by the controller is transformed to the stationary frame by a transformation unit 333, again based upon a unit vector provided by the extraction unit 331. The output 313 of the transformation unit is provided to the local power source and associated inverter 351 to control inverter operation.

The control system of FIG. 2, as described above, is well known to those skilled in the art. Such a control system supplies constant real power to the utility. The system of FIG. 2, however, does not optimize provision of reactive power to the system, and does not adaptively modify local power supply output based on changes in real power requirements. Further, in the system of FIG. 2 the filter may introduce unwanted power variation, particularly about resonant frequencies of the capacitor.

SUMMARY OF THE INVENTION

The present invention provides a load site voltage regulation control system. The load site regulation control system uses the real power generator capabilities of a micro turbine system to minimize utility power supplied and uses any excess KVA generator capability to reduce the reactive power supplied by the utility to the load.

Further, the described control system acts in a preferential manner to maximize real power generation by the micro turbine generator system, then using excess reactive power generation capabilities to reduce utility reactive power supplied. Thus, the micro turbine generation system is operated approximate its maximum efficiency.

Many of the attendant features of this invention will be more readily appreciated as the same becomes better understood by reference to the following detailed description considered in connection with the accompanying drawings in which like reference numerals indicate like parts throughout.

DETAILED DESCRIPTION

Figure 1:
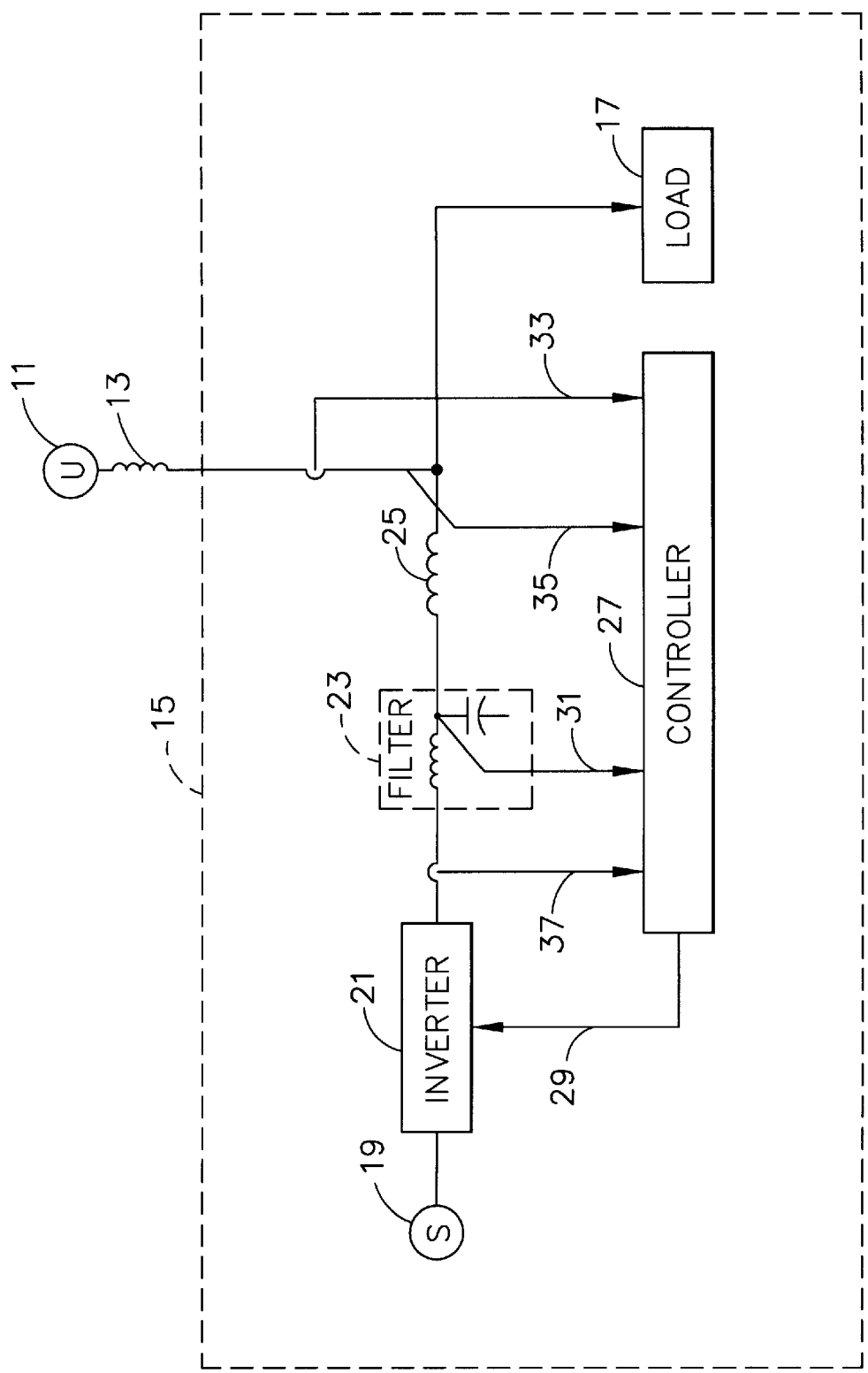
FIG. 1 is a simplified single line diagram of a power distribution system in accordance with the present invention.

FIG. 1 illustrates a power distribution system in accordance with the present invention. For simplicity, a single line diagram is used to represent the actual three-phase wire circuit. As somewhat previously discussed, the power distribution system includes a utility power source 11 providing electrical power. The utility power source provides electrical power over a transmission line having an inductive impedance 13 forming part of a feeder distribution network to a consumer 15. The consumer includes a load 17. The load may be of a variety of types, such as relatively constant resistive elements, or inductive elements such as motors or the like.

The consumer additionally includes a power source generator 19, which in one embodiment is a micro turbogenerator unit. The consumer power source is coupled to an inverter 21. The inverter allows for control and regulation of the electrical power generated by the power source generator. The inverter is in turn coupled to a filter 23, including an inductance and a capacitor. The filter acts as a smoothing mechanism, and reduces propagation of electrical noise and undesired frequencies output by the inverter. The output of the filter is coupled to the power transmission line by a transformer 25. The transformer is coupled to the power transmission line between the utility transmission line and the load at the consumer site.

A controller 27 provides control signals 29 to the inverter. Regulation of the operation of the inverter is accomplished, for example, using pulse width modulation (PWM). PWM methods and apparatus are well known in the art. The control signals regulate operation of the inverter. To determine the control signals to the inverter, the controller utilizes a capacitor voltage park vector 31 measured at the capacitor, a utility current park vector 33 measured at a point of regulation located approximate the load, a load voltage park vector 35 measured at the load, and an inverter current park vector 37 measured at the output of the inverter. Based on these signals, the controller manipulates the control signals to achieve desired voltage at the load.

The system under control is a three-phase, three-wire system. Accordingly, information from all three wires of the above discussed item are used. In a three-phase, three-wire system, however, the three-wires are subject to known relationships, and knowledge of the state of two of the wires allows the state of the third wire to be calculated. Accordingly, in one embodiment of the present invention two of the three wires are measured for the above items, with the third wire values being calculated.

Figure 2:
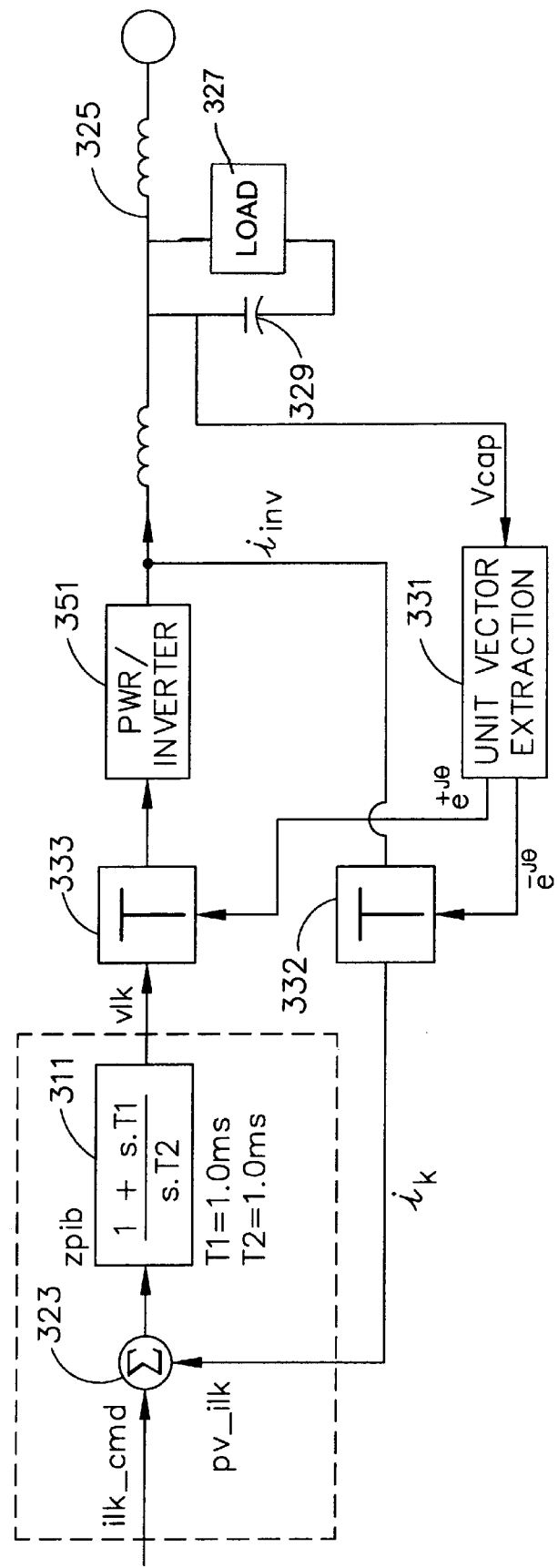
FIG. 2 is a block diagram of an inverter current regulator.

The controller dynamically determines a commanded inverter current for the inverter current regulator largely described with respect to FIG. 2. The controller utilizes the utility current Park vector and the load voltage Park vector to determine a first partial current command (571 in FIG. 3). The first partial current command maximizes micro turbine real power generator while reducing, to the extent possible, reactive power supplied by the utility. For ease of control, the utility current Park vector and the load voltage Park vector are transformed to a synchronous frame using, and referenced to, the load voltage signal. Similarly, the capacitor voltage Park vector, transformed to a synchronous frame using a filtered capacitor voltage signal, is utilized by the controller to form a second partial current command (573 in FIG. 3). The second partial current command is useful in reducing harmonics generated by the EMI filter, thereby increasing overall system stability. The first and second partial current commands are summed to form a commanded current inverter signal, which corresponds to the $i_{ikcmd}$ command reference vector described with respect to FIG. 2.

Figure 3:
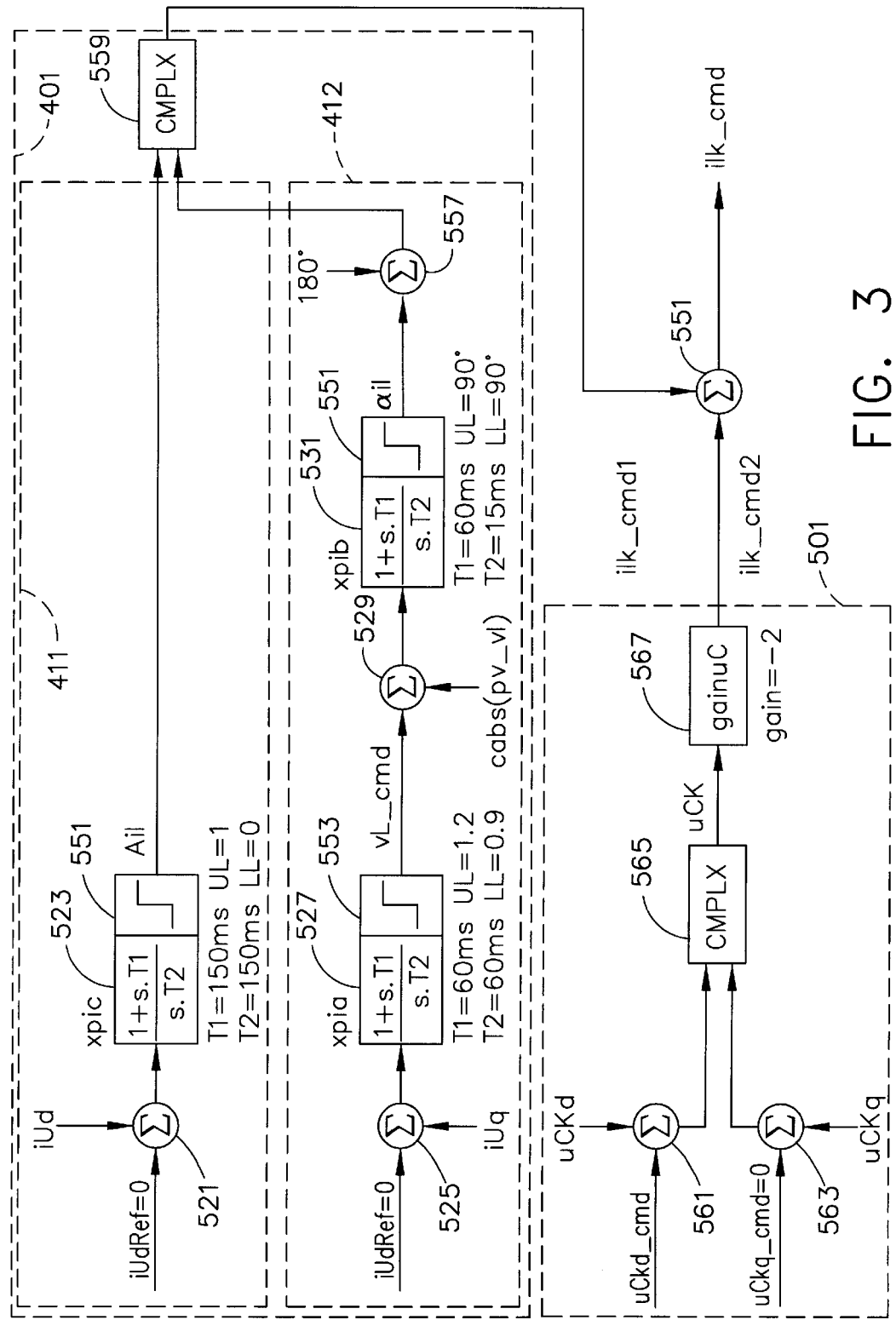
FIG. 3 is a block diagram of a control system of the present invention.

FIG. 3 is a block diagram of the portion of the control system of the present invention which forms the commanded current inverter signal. The portion of the control system of FIG. 3 includes a power controller 401, comprised of both a real current controller 411 and a reactive current controller 412, and a capacitor damping controller 501. The power controller and the capacitive damping controller provide signals which are summed to form the commanded inverter current Park vector.

The power controller attempts to operate the inverter to provide maximum use of the local electrical power source, which in the embodiment described is a turbogenerator unit. The power controller does this by attempting to drive the real component utility current to zero, within the capabilities of the turbogenerator unit. This is accomplished using the real current controller.

The power controller also attempts to minimize reactive power requirements of the load with remaining turbogenerator capabilities. The power controller does this by adjusting the angle of the inverter current vector. This is accomplished using the reactive current controller.

The real current controller 411 minimizes the real power supplied by the utility. Thus, the real power control determines a difference between a reference value and a real component of utility current. The reference value is (by default) zero, but any fixed value can be commanded by higher-level controllers (e.g. an engine fuel controller). The real component of utility current is in the synchronous frame. Therefore, as previously discussed with respect to the inverter current vector of FIG. 2, the utility current vector is transformed from the stationary frame to the synchronous frame. For the utility current signal, however, the transformation is accomplished using the voltage at the point of regulation. As the voltage at the load is measured, as a matter of convenience the voltage at the point of regulation is used to transform the utility current signal.

The difference between the reference value and real-component of the utility current produces an error signal for a proportional plus integral (PI-type) regulator. The output of PI-type regulator—limited to 1.0 power unit—is the commanded amplitude for a basic current command (AiI) to the inverter.

More specifically, the real current control 411 receives as inputs the real component of the utility phase current (in the synchronous frame) and a reference value. The real component of the utility phase current and the reference value are provided to a summer 521. The summer 521 output is the real component of the utility phase current subtracted from the reference value. Thus, the output of the summer 321 is the difference, or error, between the real component of utility phase current and the reference value. As it is desired to minimize utility supplied power, the reference value is set to zero. The output of the summer 521 is provided to a first unit 523. In the embodiment described the first unit is a proportional plus integral controller having a transfer function $G_1(s)$. A proportional plus integral controller provides a proportional response to an error message, as well as providing that response over a period of time. As the first unit is proportional plus integral controller the form of $G_1(s)$ is $(1+T_1s)/T_2s$. In the embodiment described typical values of the time constants $T_1$ and $T_2$ are both 150 milliseconds. In addition, the output of the proportional plus integral controller is limited by a limiter 551 to a range of 0 to 1 current unit, with 1 current unit corresponding to the maximum current rating of the inverter. The output of the controller 523 is a commanded amplitude for the inverter current command.

The reactive power control 412 minimizes the reactive power supplied by the utility. Two loops are involved: an outer loop and an inner loop. For the outer loop the difference between a reference value (zero by default) and the imaginary component of the utility current in the synchronous frame with respect to the point of regulation produces an error signal for a PI-type regulator. The output of the second PI-type regulator is the command for the voltage amplitude at the POR—limited to 1.2 per unit. The faster inner-loop takes the difference between this command and the voltage amplitude at the point of regulation (POR), and feeds the difference through a second PI-type regulator which, in turn, produces a commanded angle for the basic current commanded to the inverter. Beneficially, this angle is restricted to the appropriate quadrant, so that no real power is generated back into the inverter. Accordingly, the commanded inverter current angle is initially limited to the right half of the plane, but is later increased by 180° at a summer.

The reactive power control receives as inputs the reactive component of the utility phase current (in the synchronous frame) and a reference value. The reactive component of the utility phase current and the reference value are provided to a summer 525. The output of the summer 525 is the complex component of the utility phase current subtracted from the reference value. The output of the summer 525 is provided to a second unit 527. The second unit is a proportional plus integral controller, whose transfer function is $G_2(s)$. As illustrated, typical values for the time constants for the second unit proportional plus integral controller 527 are 60 milliseconds for the numerator and 60 milliseconds for the denominator. The second unit also includes a limiter 553. The limiter limits the output of the second unit to a range of 0.9 to 1.2 per unit voltage.

The output of the proportional plus integral controller 527 is provided to a summer 529. The summer 529 is also provided the magnitude of the complex park vector of the voltage at the load. The output of the summer 529 is therefore the output of the proportional plus integral controller 527 minus the magnitude of the park vector of the voltage at the load. Thus, the output of the summer 529 is the difference between the reactive commanded voltage and the reactive component of voltage at the load.

The output of the summer 529 is provided to a third unit 531. The third unit is a proportional plus integral controller whose transfer function is $G_3(S)$. The third unit proportional plus integral controller has typical time constants of 60 milliseconds in the numerator and 15 milliseconds in the denominator. In addition, the third unit includes a limiter 551. The limiter limits the angle of the output of the third unit to between −90 and 90. The output of the third unit is provided to a summer 557. The summer 557 additionally receives an angle of 180. The addition of the 180 serves to limit the commanded angle to between 90 and 270. The output of the real power control, which corresponds to a commanded amplitude for current, and the output of the reactive power control, corresponds to commanded current angle, are provided to a complex summer 559. The complex summer transforms the complex current command in polar (r,θ) coordinates to a rectangular (Real, Imaginary) coordinate system.

Thus, the power controller includes real power and reactive power control. Further, the real power and reactive power control is performed dynamically.

Figure 4:
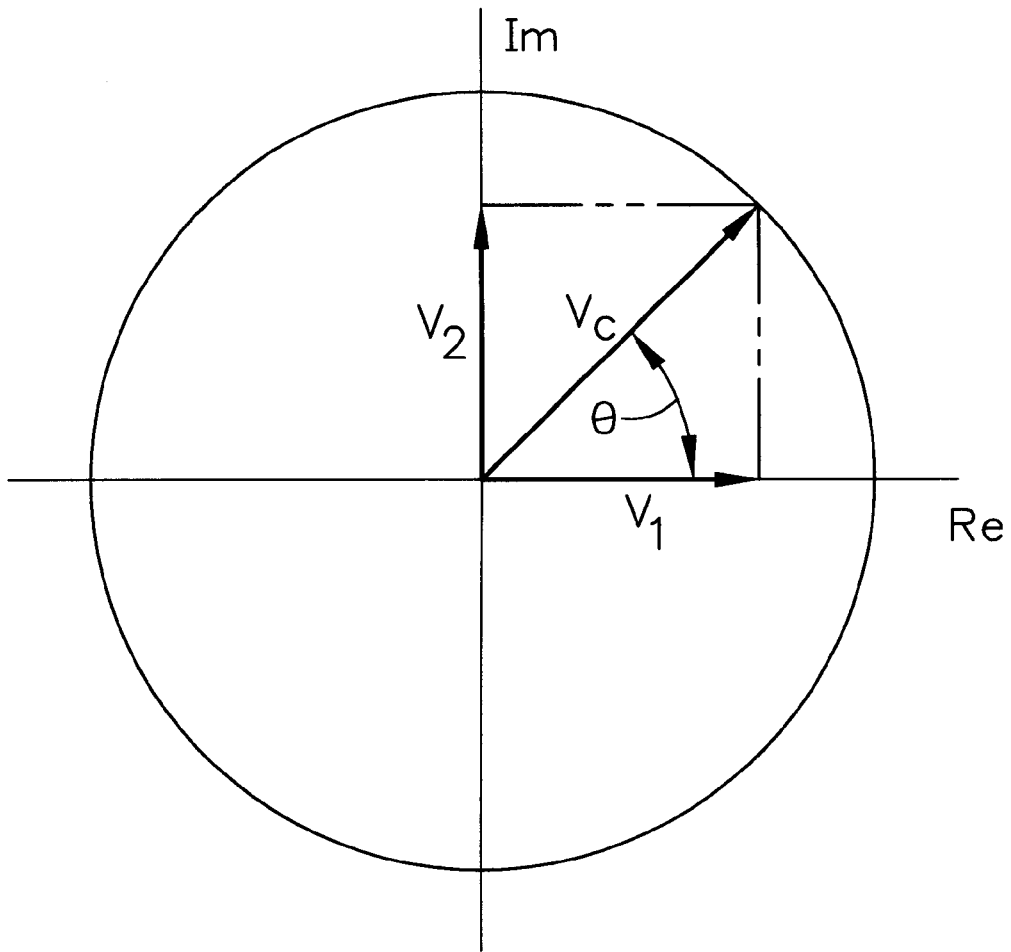
FIG. 4 is a vector diagram used to describe operation of the controller of FIG. 3.

Operation of the power controller may be described with respect to FIG. 4. The real current controller determines a magnitude of an inverter current command Park vector. Pictorially, this is the magnitude of the vector $v_1$. As indicated, the magnitude of vector $v_1$ is less than the capability of the turbogenerator unit. The reactive current controller, however, determines a need for reactive power of the magnitude of the vector $v_2$. Accordingly, the reactive power controller commands an angle θ. The inverter current commanded by the power controller therefore is a vector with a magnitude of $v_1$ and an angle of θ. Over time, however, as the angle of the actual inverter current begins approaching the angle of the initial commanded current vector the inverter is not providing sufficient real power. Accordingly, the real power controller increases the magnitude of the commanded inverter current vector until the magnitude is equal to the magnitude of vector $v_c$.

The capacitor damping controller is provided to damp the EMI filter about its resonant frequency. As the EMI filter is comprised of an inductor and a capacitor, which can be described as an underdamped second order system, the EMI filter has a potentially large gain about its resonant frequency. This gain may cause unwanted effects, including power fluctuations and possible system instability.

Figure 5:
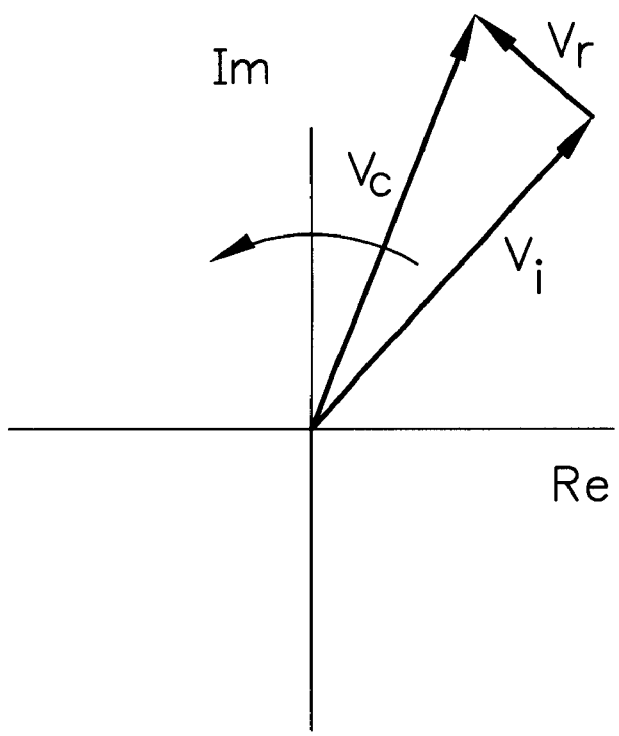
FIG. 5 is a vector diagram showing the capacitor voltage.

The capacitive damping controller provides an inverter current command to dampen resonance caused by the EMI filter. The resonance caused by the EMI filter can be depicted as shown in FIG. 5, which shows voltage at the capacitor as a vector $v_c$. The vector $v_c$ is the sum of two vectors, a voltage vector $v_i$ due to the inverter and a voltage $v_r$, due to the response at the EMI filter at the resonant frequency. FIG. 5 illustrates the vectors in the rotational frame, and the vector $v_c$ rotates about the origin at the fundamental frequency. The vector $v_r$, however, rotates at a different, increased frequency.

The voltage due to the resonance of the EMI filter, in addition to potentially causing instability or other problems, also increases the difficulty in transforming inverter information to the synchronous frame. Unless the vector $v_r$ is not considered in extracting a unit from the capacitor voltage, the unit vector will not rotate in the stationary frame at the fundamental frequency.

Thus, the capacitor voltage is filtered prior to extracting the capacitor voltage unit vector. The capacitor voltage is provided to a low pass filter. The low pass filter has cutoff point one decade in frequency before the system fundamental frequency. Accordingly, the filter, in addition to removing unwanted high frequency components, also phase shifts the input capacitor voltage vector. The output of the filter therefore is provided to a phase shifter which phase shifts the filter output by 90 degrees. The output of the filter and phase shifter (actually a phase reshifter as the filter also performs phase shifts) is used for all of the transformations to the synchronous frame using the capacitor voltage.

Turning to the capacitive damping controller, the magnitude and phase of the unfiltered capacitor voltage park vector are compared with a commanded capacitor voltage park vector. The commanded capacitor voltage park vector is simply the filtered capacitor park vector, which has a magnitude and a zero phase. The magnitude and phase differences are combined and multiplied by a negative gain to form the capacitive damping inverter command.

The objective of the damper controller is to reduce higher order harmonic currents in the capacitor bank that can be caused by the external noise generating and exciting a resonant circuit comprising the output capacitor and line/utility reactance.

The reference to the regulator 565 is the amplitude of the fundamental of the capacitor bank voltage. Thus, the output of summers 561, 562 is the higher order harmonics of the capacitor bank park vector. These signals are combined to form a complex vector in a combined 565, and are amplified by an amplifier 567.

Although this invention has been described in certain specific embodiments, many additional modifications and variations will be apparent to those skilled in the art. It is therefore to be understood that this invention may be practiced otherwise than as specifically described. Thus, the present embodiments of the invention should be considered in all respects as illustrative and not restrictive, the scope of the invention to be indicated by the appended claims and their equivalents rather than the foregoing description.

What is claimed is:

1. A power controller adapted for load site voltage regulation, the load site receiving power signals from a distant power source and the load site including a load site source, the power controller comprising:
    a real power controller receiving an indication of real power supplied from the distant power source and a reference real power signal and outputting a commanded real power signal;
    a reactive power controller receiving an indication of reactive power supplied from the distant power source and a reference reactive power signal and outputting a commanded reactive power signal;
    a regulator controller receiving the commanded real power signal, the commanded reactive power signal, and an indication of power at the load and outputting a regulator control signal for use in load site voltage regularization; and
    a damping controller receiving a signal indicative of signal magnitude from a filter and providing a damping control signal to the regulator controller.

2. The power controller adapted for load site regulation of claim 1 wherein the reference real power signal and the reference reactive power signal are zero.

3. The power controller adapted for load site regulation of claim 2 wherein the real power controller comprises an integral plus proportional controller.

4. The power controller adapted for load site regulation of claim 3 wherein the reactive power controller comprises a first controller section and a second controller section, the first controller section forming a reactive power error signal, an indication of which is provided to the second controller section for use in forming the commanded reactive power signal.

5. The power controller adapted for load site regulation of claim 4 wherein the first controller section and the second controller section comprise proportional plus integral controllers.

6. The power controller adapted for load site regulation of claim 1 wherein the regulator control signal is a commanded inverter voltage.

7. The power controller adapted for load site regulation of claim 6 wherein the damping controller comprises an inverting amplifier.

8. A power controller adapted for load site voltage regulation, the load site receiving power from a distant power source and the load site including a load site source and a load, the power from the distance power source including a current signal having a real component and a reactive component, the load site source having a maximum power producing capability including a maximum real and reactive power producing capability, and the load having a real and a reactive power requirement, the power controller comprising:
    a real current controller receiving an indication of real current supplied from the distant power source and a reference real current signal, the real current controller outputting a commanded real current amplitude signal;
    a reactive current controller receiving an indication of reactive current supplied from the distant power source and a reference reactive current signal, the reactive current controller outputting a commanded voltage amplitude signal; and
    an angle regulator controller receiving a difference between the commanded voltage amplitude signal and a sensed voltage amplitude at the load site, the angle regulator adjusting the angle of the commanded real current amplitude signal such that the real component of the power supplied by the distance power source is minimized.

9. A method for regulating voltage at a load site connected to a utility power source over transmission lines, the load site including a power generator unit operatively coupled to an inverter operatively coupled to a load by a path including a filter, the method comprising:
    determining an indication of load voltage;
    determining an indication of utility current provided by the utility power source to the load;
    determining an indication of inverter current;
    forming a commanded current signal using the indication of load voltage and the indication of utility current; and
    forming an inverter voltage command using the indication of inverter current and the commanded current signal.

10. The method for regulating voltage at a load site of claim 9 wherein the indication of load voltage, the indication of utility current, the indication of inverter current and the inverter voltage command are park vectors.

11. The method for regulating voltage at a load site of claim 10 wherein forming a commanded current signal using the indication of load voltage and the indication of utility current comprises:

determining a real component of utility current;

comparing the real component of utility current to a reference signal to form a commanded amplitude of current;

determining a reactive component of utility current;

comparing the reactive component of utility current to an indication of load voltage for form a commanded angle of current; and combining the commanded amplitude of current and the commanded angle of current to for the commanded current signal.

12. The method for regulating voltage at a load site of claim 11 further comprising determining an indication of filter voltage and modifying the commanded current signal using the indication of filter voltage.

13. The method for regulating voltage at a load site of claim 12 wherein the indication of filter voltage is a park vector.

14. The method for regulating voltage at a load site of claim 13 wherein the indication of filter voltage is about a resonant frequency of the filter.

15. The method for regulating voltage at a load site of claim 14 wherein the commanded current signal is modified by the indication of filter voltage by subtracting a multiple of the indication of filter voltage as compared against a commanded filter voltage.

16. An apparatus including a multiloop control system for voltage regulation for load sites at the end of feeder lines, the load sites including a load coupled to the feeder lines and local power generation units with voltage regulators coupled to the feeder lines, the apparatus comprising:

means for determining a commanded amplitude of current using an indication of a real component of feeder line current;

means for determining a commanded angle of current using an indication of a reactive component of feeder line current and an indication of load voltage, said means for determining a commanded angle including means for limiting the angle of the commanded angle of current to one or more predefined quadrants; and means for determining a voltage regulator control signal controlling operation of the voltage regulator using the commanded amplitude of current and the commanded angle of current.

17. The apparatus including a multiloop control system for voltage regulation for load sites at the end of feeder lines of claim 16 further comprising means for determining a damping control signal, the damping control signal, the damping control signal additionally being used by the means for determining a voltage regulator control signal.

18. A power controller adapted for load site voltage regulation, the load site receiving power from a distant power source and the load site including a load site source, the power from the distance power source including a current signal having a real component and a reactive component, the power controller comprising:

a real current controller receiving an indication of the real current supplied from the distant power source and a reference real current signal, the real current controller outputting a commanded real current amplitude signal;

a reactive current controller receiving an indication of the reactive current supplied from the distant power source and a reference reactive current signal, the reactive current controller outputting a commanded reactive current signal;

a regulator controller for receiving the commanded real current signal, the commanded reactive current signal, and an indication of power at the load, the regulator controller outputting a regulator control signal for use in load site voltage regularization; and a damping controller receiving a signal indicative of current magnitude from a filter, and providing a damping control signal to the regulator controller.

19. A power controller adapted for load site voltage regulation, the load site receiving power signals from a distant power source and the load site including a load site source and a load, the load site source having a maximum power producing capability including a maximum real and reactive power producing capability, and the load having a real and a reactive power requirement, the power controller comprising:

a real power controller receiving an indication of real power supplied from the distant power source and a reference real power signal and outputting a commanded real power signal;

a reactive power controller receiving an indication of reactive power supplied from the distant power source and a reference reactive power signal and outputting a commanded reactive power signal; and a regulator controller receiving the commanded real power signal, the commanded reactive power signal, and an indication of power at the load, the regulator controller allowing the load site source to provide a predetermined portion of the real power required by the load up to the maximum real power producing capability of the load site source, after which the regulator controller allowing the distance power source to provide any remaining real power required by the load.

20. A power controller according to claim 19 wherein the regulator controller causes the load site source to provide substantially all of the real power required by the load up to the maximum real power producing capability of the load site source, after which the regulator controller causes the distance power source to provide any remaining real power required by the load.

21. A power controller according to claim 19 wherein the regulator controller attempts to match the real power provided by the load site source with the real power required by the load when the real power required by the load is less than the power producing capability of the local site source.

22. The power controller according to claim 19, wherein the regulator controller adjusts the angle of the power provided to the load by the local site source such that the reactive power required from the distant power source is minimized.

23. The power controller according to claim 22, wherein the regulator controller uses any excess power producing capability of the local site source to adjust the angle of the power provided to the load by the local site source such that the reactive power required from the distant power source is minimized.

24. An apparatus including a multiloop control system for voltage regulation for load sites at the end of feeder lines, the load sites including a load coupled to the feeder lines and local power generation units with associated voltage regulators coupled to the feeder lines, the load site source having a maximum power producing capability including a maximum real and reactive power producing capability, and the load having a real and a reactive power requirement, the apparatus comprising:

means for determining a commanded amplitude of current using an indication of a real power component of feeder line current;

means for determining a commanded angle of current using an indication of a reactive component of feeder line current and an indication of load voltage; and means for determining a voltage regulator control signal controlling operation of the voltage regulator using the commanded amplitude of current and the commanded angle of current, the voltage regulator control signal directing the voltage regulator to allow the load site source to provide a predetermined portion of the real power required by the load up to the maximum real power producing capability of the load site source, after which the voltage regulator control signal directing the voltage regulator to allow the distance power source to provide any remaining real power required by the load.

25. A power controller adapted for load site voltage regulation, the load site receiving power from a distant power source and the load site including a load site source and a load, the power including current and voltage signals from the distance power source which are coupled to the load, the load site source having a maximum power producing capability including a maximum real and reactive power producing capability, and the load having a real and a reactive power requirement, the power controller comprising:

a regulator controller coupled between the local site source and the load, the regulator controller allowing the load site source to provide a predetermined portion of the real power required by the load up to the maximum real power producing capability of the load site source, after which the regulator controller allowing the distance power source to provide any remaining real power required by the load.

26. A power controller according to claim 25 wherein the regulator controller causes the load site source to provide substantially all of the real power required by the load up to the maximum real power producing capability of the load site source, after which the regulator controller causes the distance power source to provide any remaining real power required by the load.

27. A power controller according to claim 25 wherein the regulator controller attempts to match the real power provided by the load site source with the real power required by the load when the real power required by the load is less than the power producing capability of the local site source.

28. The power controller according to claim 25, wherein the regulator controller adjusts the angle of the power provided to the load by the local site source such that the reactive power required from the distant power source is minimized.

29. The power controller according to claim 28, wherein the regulator controller uses any excess power producing capability of the local site source to adjust the angle of the power provided to the load by the local site source such that the reactive power required from the distant power source is minimized.

30. A method for regulating the voltage of load site, the load site receiving power from a distant power source and the load site including a load site source and a load, the power including current and voltage signals from the distance power source which are coupled to the load, the load site source having a maximum power producing capability including a maximum real and reactive power producing capability, and the load having a real and a reactive power requirement, the method comprising:

allowing the load site source to provide a predetermined portion of the real power required by the load up to the maximum real power producing capability of the load site source; and allowing the distance power source to provide any remaining real power required by the load if the maximum real power producing capability of the load site source are exceeded.

31. A method according to claim 30, further comprising allowing the load site source to provide substantially all of the real power required by the load up to the maximum real power producing capability of the load site source.

32. A method according to claim 30, further comprising attempting to match the real power provided by the load site source with the real power required by the load when the real power required by the load is less than the power producing capability of the local site source.

33. A method according to claim 30, wherein the local site source provides voltage and current signals to the load, where the current signal has an angle, the method further comprising the step of adjusting the angle of the current signal provided to the load by the local site source such that the reactive power required from the distant power source is minimized.

34. A method according to claim 33 further comprising using any excess power producing capability of the local site source to adjust the angle of the current signal provided to the load by the local site source such that the reactive power required from the distant power source is minimized.

* * * * *